(12) United States Patent
Chamberlain et al.

(10) Patent No.: US 6,940,421 B2
(45) Date of Patent: Sep. 6, 2005

(54) METHOD AND APPARATUS FOR EFFICIENT USE OF COMMUNICATION CHANNELS FOR REMOTE TELEMETRY

(75) Inventors: Roger D. Chamberlain, St. Louis, MO (US); John C. Bell, Crestwood, MO (US)

(73) Assignee: BECS Technology, St. Louis, MO (US)

( * ) Notice: Subject to any disclaimer, the term of this patent is extended or adjusted under 35 U.S.C. 154(b) by 943 days.

(21) Appl. No.: 09/730,170

(22) Filed: Dec. 5, 2000

(65) Prior Publication Data

US 2002/0067284 A1 Jun. 6, 2002

(51) Int. Cl.$^7$ .............................................. G08C 15/00
(52) U.S. Cl. ............................. 340/870.02; 340/870.11; 379/106.07; 379/102.05
(58) Field of Search ....................... 340/870.28, 870.02, 340/870.31, 539, 870.11; 370/337, 347, 348, 341, 349, 312, 322, 461, 462, 438, 439; 379/106.03, 283

(56) References Cited

U.S. PATENT DOCUMENTS

| | | | |
|---|---|---|---|
| 4,713,837 A | * 12/1987 | Gordon | 379/106.07 |
| 5,276,703 A | * 1/1994 | Budin et al. | 375/130 |
| 5,748,104 A | * 5/1998 | Argyroudis et al. | 340/870.11 |
| 5,892,758 A | * 4/1999 | Argyroudis | 370/335 |
| 5,963,650 A | * 10/1999 | Simionescu et al. | 705/63 |
| 6,014,089 A | 1/2000 | Tracy et al. | |
| 6,571,093 B1 | * 5/2003 | Jarrett, Jr. | 455/408 |

* cited by examiner

Primary Examiner—Michael Horabik
Assistant Examiner—Hung Q Dang
(74) Attorney, Agent, or Firm—Polster, Lieder, Woodruff & Lucchesi LP (57) ABSTRACT

A remote telemetry system utilizing dual communication pathways comprising low-cost remote communications devices operating on existing wire-based communications systems, wireless communications systems, and/or a combination thereof, to provide real-time reading and control of the remote telemetry units. A central controller directs the operation of the remote telemetry units and receives data from the remote telemetry units. The central controller is configured to utilize a conventional broadcast communications channel to transmit commands to individual remote telemetry units, each of which is assigned a unique identification code. Signals broadcast from the central controller are received at receivers associated with each remote telemetry unit, which performs a directed operation if a unique identification code included in the broadcast signal matches the identification code assigned to the remote telemetry unit. Each remote telemetry unit is provided with access to a conventional shared two-way communication pathway for return communication to the central controller. The shared two-way communication pathway is inactive unless specifically activated by a remote telemetry unit upon receipt of a signal from the central controller. In this manner, a large number of remote telemetry units may be provided with regulated access to a single shared two-way communications channel.

11 Claims, 5 Drawing Sheets

METHOD AND APPARATUS FOR EFFICIENT USE OF COMMUNICATION CHANNELS FOR REMOTE TELEMETRY

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

Remote telemetry is a technique by which telemetry data collected at a remote location is collected in a central repository (e.g., a host computer) for analysis and archival purposes. The telemetry data might be any physical measurement, such as a liquid level, weight, pH, chlorine concentration, temperature, pressure, proximity, etc., and is sensed by a Remote Telemetry Unit (RTU). It is common for a number of RTUs to be in relatively close proximity to one another (e.g., on a factory floor); even though they might be quite a distance from the central host (e.g., in another city).

In many potential applications of remote telemetry, there are barriers that must be overcome to make the application feasible. One barrier present in many situations is the need to establish two-way communications between each RTU and the central host in a manner that is inexpensive and/or power efficient. Examples of such two-way links commonly include dedicated telephone lines, cellular telephone links, wireless data networks, shared media data networks, and other wireless technologies. Each of these two-way links has drawbacks. A high financial cost is associated with dedicated telephone lines due to regulations limiting the routing of the phone lines, as well as regulations controlling the cost to the consumer. Similar high costs are associated with cellular telephone networks and data networks, which must pay either a monthly fee or per packet of information transferred. In the case of wireless technologies, there must be a wireless receiver active at all times as to receive signals transmitted either from the RTUs or from the host computer.

U.S. Pat. No. 6,014,089 to Tracy et al. for "Method For Transmitting Data Using Digital Control Channel Of A Wireless Network," herein incorporated by reference, discloses an apparatus and method for transmitting data to and from a data collection device using the short message service functionality of the control channel of a personal communications system transmission protocol. The '089 patent discloses a method wherein a request for data from a remote device is transmitted to a data collection device using the short message service portion of a digital personal communications system control channel protocol. The requests are received at the data collection device, interpreted, and the requested data compiled therein. The compiled data is then transmitted back to the remote device from the data collection device on the same short message service portion of the digital personal communications system control channel as was used to transmit the request for data.

U.S. Pat. No. 5,892,758 to Argyroudis for "Concentrated Subscriber Wireless Remote Telemetry System" and U.S. Pat. No. 5,748,104 to Argyoudis for "Wireless Remote Telemetry System", both herein incorporated by reference, each disclose variations on a wireless remote telemetry system utilizing low-cost remote communications devices operating on an existing wireless communications system in order to provide real-time reading and control of the remote devices. In these systems, remote metering devices collect and forward data to an associated wireless remote telemetry device which in turn, relays data over existing wireless communications systems, such as cellular base stations, using a shared random access channel to a central controller. The central controller of these systems, in turn, regulates the operation of the wireless remote metering units by transmitting messages over a corresponding paging channel. The shared random access channel and the associated paging channel are separate logical partitions of a single physical mechanism for delivering data. Specifically, these patents disclose using a PCS communications link having a common frequency band and utilizing CDMA code to establish a link. Furthermore, to effectively utilize this system, each of the remote telemetry units is required to have a unique address on the two-way communications link, such that the central controller can communicate individually with each remote unit over this link.

BRIEF SUMMARY OF THE INVENTION

Briefly stated, the present invention is a novel and improved remote telemetry system which uses low-cost remote communications devices operating on existing wire-based communications systems, wireless communications systems, and/or a combination thereof in order to provide real-time reading and control of remote telemetry units.

A central controller for directing the operation of the remote telemetry units and for receiving data from the remote telemetry units is configured to utilize a conventional broadcast communications channel, such as a cellular paging system, to transmit commands to individual remote telemetry units, each of which is assigned a unique identification code. This unique identification code does not need to be known to the broadcast communications channel mentioned above, or to the two-way communications channel mentioned below. It is known to the central controller and the remote telemetry units only.

Signals broadcast from the central controller are received at a low-cost receiver associated with each remote telemetry unit, which performs a directed operation if a unique identification code included in the broadcast signal matches the identification code assigned to the remote telemetry unit.

Each remote telemetry unit further includes access to a conventional shared two-way communication channel, for example, each remote telemetry unit may be provided with one of several cellular radiotelephones assigned to the same telephone number, or may be associated one of several line extensions on the same wire-based telephone line. Each shared two-way communications channel will be inactive unless specifically activated by a remote telemetry unit upon receipt of a signal from the central controller.

By broadcasting only a single unique identification code at a time, the central controller regulates access to the shared two-way communications channel, such that no conflicts arise. In this manner, a large number of remote telemetry units may be provided with regulated access to a single shared two-way communications channel. Furthermore, by utilizing a conventional broadcast communications channel to transmit commands from the central controller to the remote telemetry units, the costs associated with dedicated lines may be eliminated or reduced and power consumption minimized.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
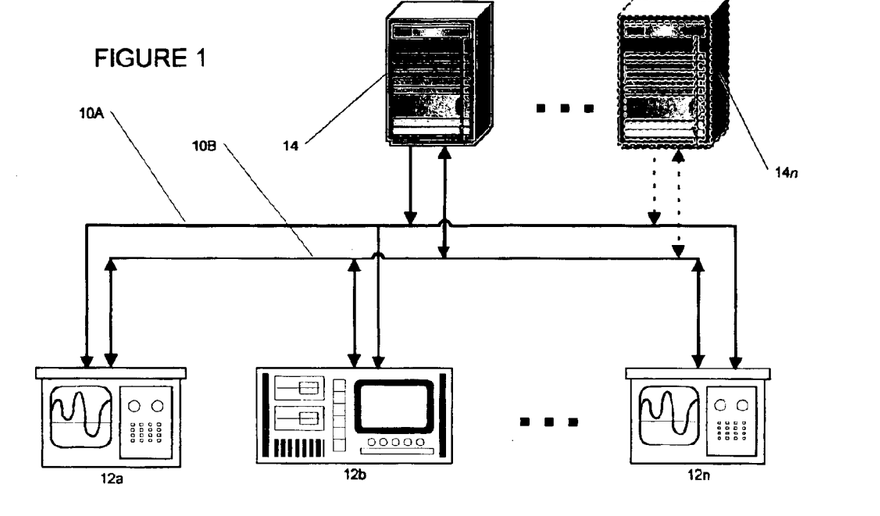
FIG. 1 is a system diagram of the present invention, illustrating two separate communication pathways between a number of central controllers and a number of remote telemetry units.
Figure 2:
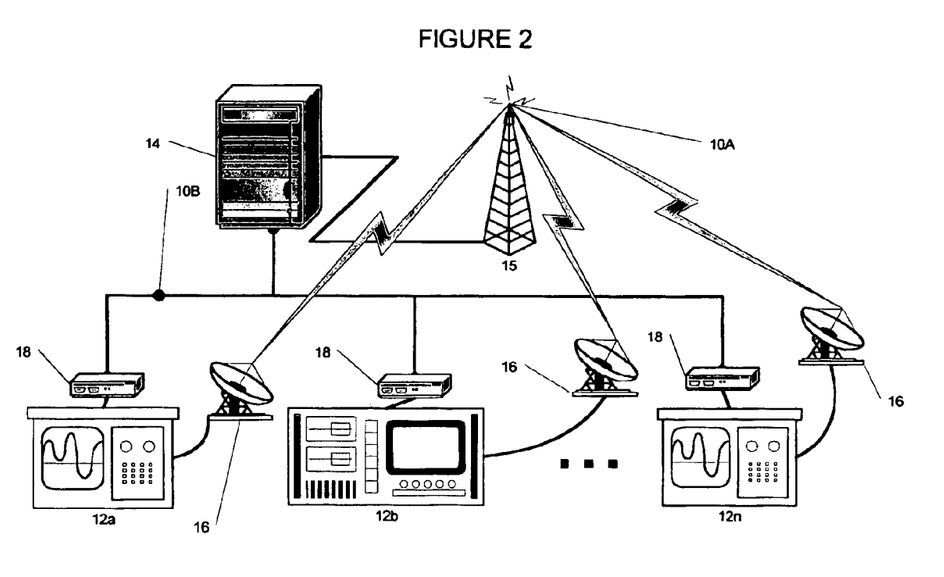
FIG. 2 is a system diagram of the present invention illustrating a broadcast communication pathway between the central controller and the remote telemetry units.

Turning to the drawings, and to FIGS. 1 and 2 in particular, the broad concept of the present invention is shown generally by the communications network 10 interconnecting a number of remote telemetry units 12a–12n, comprising one or more sets, and one or more central controllers 14–14n. The following general description is set forth in the context of a single central controller 14, and will be expanded to cover multiple central controllers 14–14n below.

The communications network 10 comprises two separate and distinct communication pathways 10A and 10B. The first communication pathway 10A, is a broadcast communications pathway, utilized by the central controller 14 through a transmitter 15 to transmit control messages to the remote telemetry units 12a–12n. Each remote telemetry unit 12a–12n in a set is assigned a unique identification code, and each control message transmitted from the central controller 14 over the broadcast communications pathway 10A may include the unique identification code of the intended recipient remote telemetry unit 12a–12n, or may be intended as a general instruction for each of the remote telemetry units 12a–12n in the set. Remote telemetry units 12a–12n each incorporate a receiver 16 configured to receive the control messages transmitted by the central controller 14 over the broadcast communications pathway 10A. Preferably, the receivers 16 are low cost to manufacture, and are optimized for low power consumption. The broadcast communications pathway 10A is utilized only by the central controller 14 to transmit control messages to the remote telemetry units 12a–12n.

The second communication pathway 10B, which interconnects each of the remote telemetry units 12a–12n of a set and the central controllers 14–14n is a shared two-way communications pathway, and is utilized only by the remote telemetry units 12a–12n in the set to transmit report messages to the central controller 14 or to establish a communications link thereto. Since the two-way communications pathway 10B is shared among each of the remote telemetry units 12a–12n of the set, to avoid cross-talk and communications conflicts, only one remote telemetry unit in each set may transmit a report message or establish a communications link to the central controller 14 at any given time. Accordingly, while each of the remote telemetry units 12a–12n includes a transceiver 18 configured to access the shared two-way communications pathway 10B, each transceiver 18 is inactive, or turned off, until specifically activated by the associated remote telemetry unit 12a–12n upon receipt of a control message over the broadcast communications pathway 10A from the central controller 14.

When an individual remote telemetry unit 12a–12n of the present invention receives a broadcast message from the central controller 14 over the communications pathway 10A, it interprets the message to obtain the unique identification contained therein. If the unique identification contained in the message corresponds to the unique identification code associated with the individual remote telemetry unit 12a–12n, the remainder of the control message is interpreted to identify the operational instructions transmitted from the central controller. The operational instructions may direct the individual remote telemetry unit to perform one or more actions, for example, shut down, to update a measurement, to erase stored data, or to transmit a current and/or stored data to the central controller over the shared two-way communications pathway 10B.

In the event a remote telemetry unit receives an instruction to transmit data to the central controller 14 over the shared two-way communications pathway 10B, the remote telemetry unit activates the transceiver 18, establishes a connection to the central controller 14 over the shared two-way communications pathway 10B, and transmits the requested information. No unique identification of the remote telemetry units 12a–12n is present on the shared two-way communications pathway 10B, hence all communications over communications pathway 10B to the central controller 14 must be initiated by a remote telemetry unit 12a–12n. Upon completion of the data exchange, the remote telemetry unit closes the connection to the central controller 14, and again deactivates the associated transceiver 18, thereby freeing the shared two-way communications pathway 10B for use by another remote telemetry unit 12a–12n.

As is indicated in FIG. 1, the communication pathways 10A and 10B may be shared by a number of central controllers 14–14n. In such cases, the messages transmitted from an individual central controller 14–14n over the broadcast communications pathway 10A includes an identification for both the intended recipient remote telemetry unit 12a–12n and the central controller 14–14n initiating the communication. In this manner, the remote telemetry unit 12a–12n can direct a return message over the shared two-way communications pathway 10B to the identified central controller 14–14n. Those of ordinary skill in the art will recognize that for networks utilizing multiple central controllers 14–14n, the central controllers must coordinate transmissions over the broadcast network 10A to maintain media access control.

In a first alternate embodiment, a conventional wireless pager system serves the function of the broadcast communications pathway 10A from the central controller 14 to each of the remote telemetry units 12a–12n. Each receiver 16 at the remote telemetry units is a wireless pager, capable of receiving messages broadcast over a conventional cellular pager system. Each of the wireless pagers is assigned to the same cellular pager number within the conventional cellular system, such that when the central controller 14 is required to communicate with any remote telemetry unit, it calls the single cellular pager number, and transmits a unique identification code together with one or more operating instructions as the pager message. Each of the remote telemetry units receives the broadcast cellular pager message on its associated wireless pager, and compares the unique identification code in the broadcast message with its own unique identification code. The remote telemetry unit 12a–12n for which the message is intended will identify a match between its unique identification code and the unique identification code broadcast on the cellular paging message, and will subsequently carry out the one or more operating instructions contained within the remained of the cellular broadcast message. None of the other remote telemetry units 12a–12n will perform any action.

Figure 3:
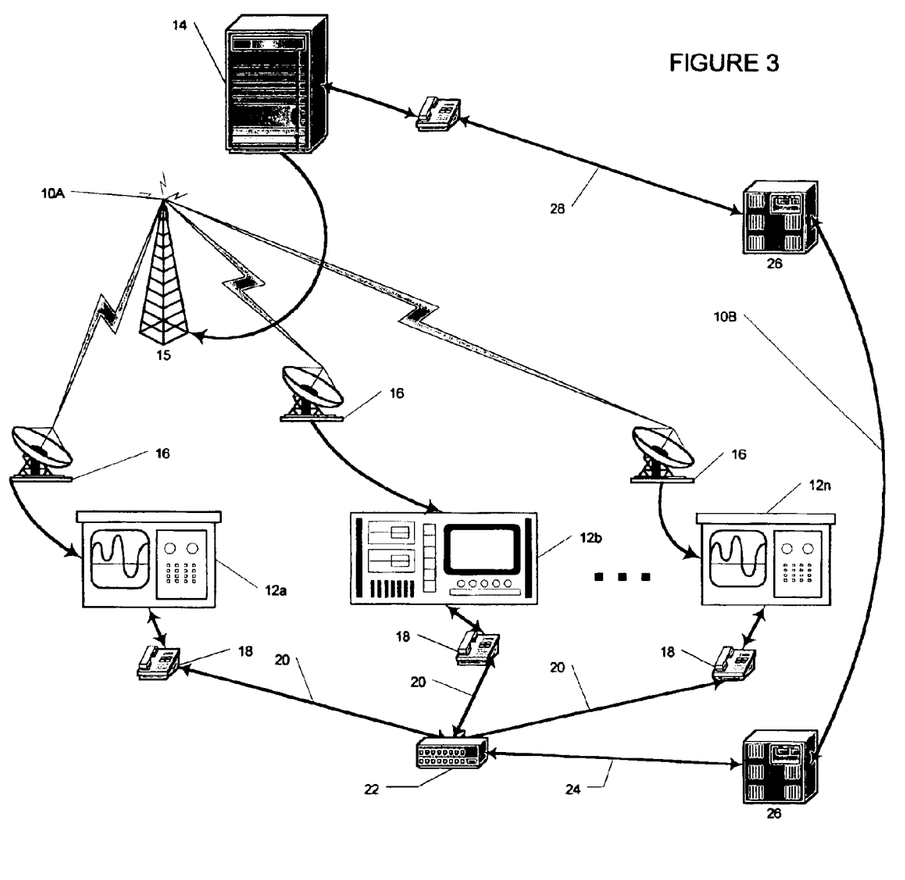
FIG. 3 is a system diagram, similar to FIG. 2, further illustrating each of the remote telemetry units connected to a telephone line extension to establish a shared two-way communication pathway to the central controller.

In a second alternate embodiment illustrated in FIG. 3, the transceiver 18 of each of the remote telemetry units 12a–12n within a set is a conventional telephone unit (i.e. a conventional modem) linked to the shared two-way communications pathway 10B such as a line extension 20 associated with a multiplexer 22 assigned to a single subscriber telephone line 24 in a conventional telephone network 26, in much the same manner as multiple telephone units are connected to a single residential subscriber telephone line. Here, all of a set of remote telemetry units are associated with a single telephone number. The central controller 14, in turn, is linked to a second subscriber telephone line 28, and connected to the conventional telephone network 26. Each remote telemetry unit 12a–12n will only activate its associated conventional telephone unit, (i.e., go "off-hook") upon receiving a request for communication from the central controller 14 over the broadcast communications pathway 10A, or only after first determining that the telephone line is not currently in use by another remote telemetry unit. Since no two remote telemetry units will ever utilize the shared two-way communications pathway 10B simultaneously, conflicts over usage of the single telephone line will not arise.

Figure 4:
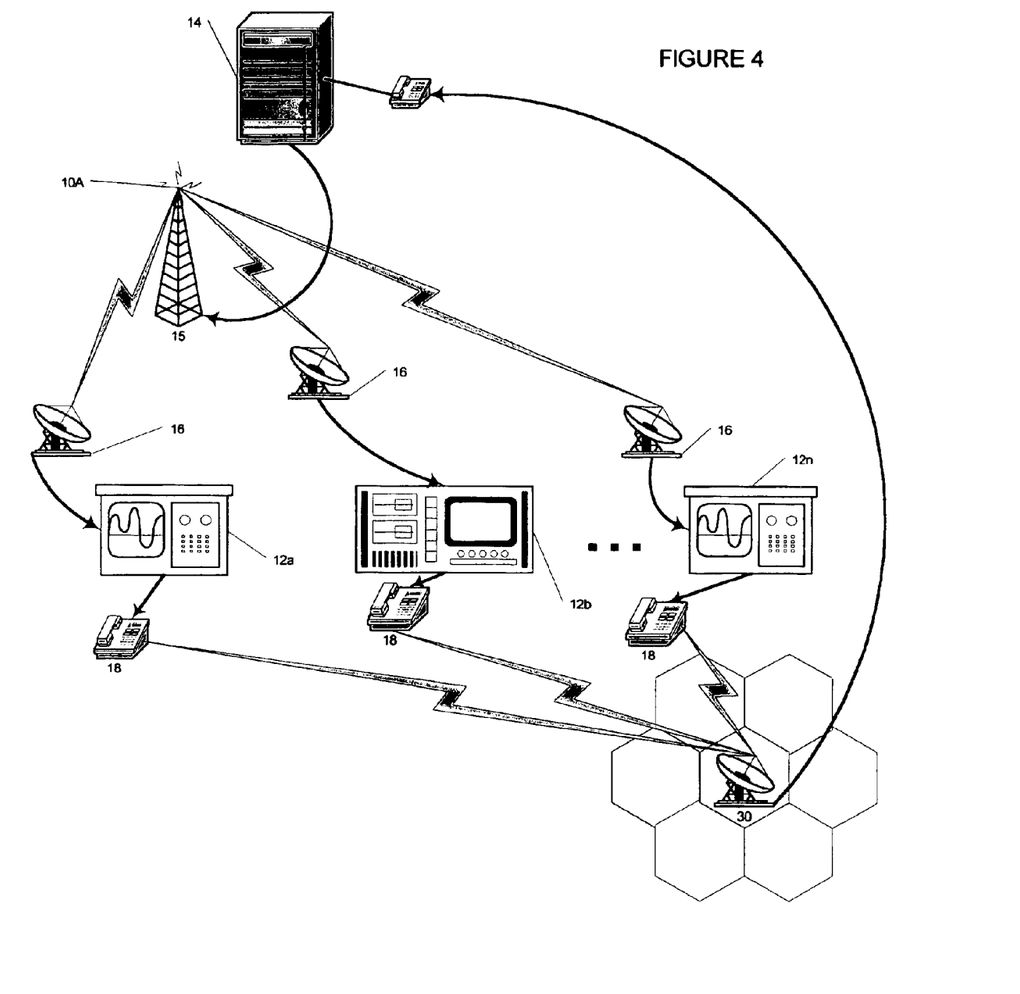
FIG. 4 is a system diagram, similar to FIG. 2, further illustrating a cellular telephone shared two-way communications pathway connecting the remote telemetry units to the central controller.

In a third alternate embodiment, illustrated in FIG. 4, the transceiver 18 of each of the remote telemetry units 12a–12n within a set is a conventional cellular radiotelephone, with a conventional cellular telephone network 30 forming the shared two-way communications pathway 10B. The conventional cellular telephone network 30 may be either a digital or analog cellular system, and may include one or more wire-based telephone connections. Each of the transceivers 18 may be associated with a unique cellular telephone identification number, or, to reduce the costs associated with maintaining large numbers of cellular telephone numbers, each of the transceivers 18 may be associated with the same cellular telephone identification number. During periods of non-use, each of the transceivers 18 is powered down, such that it is not visible to the conventional cellular telephone system. Only after receiving a command from the central controller 14 over the broadcast communications pathway 10A will a single remote telemetry unit within a set activate its associated transceiver 18 and establish a connection to the central controller 14 over the conventional cellular telephone system. Since no two transceivers 18 associated with a set of remote telemetry units 12a–12n will be activated at the same time, the conventional cellular telephone system cannot distinguish between multiple cellular telephones having a common cellular identification number and a single cellular telephone which is turning on and off as it is moved from one physical location to another. Therefore, the costs associated with maintaining a single cellular telephone identification number in the conventional cellular telephone system will be greatly reduced from the cost of having to maintain a unique cellular telephone identification number in the conventional cellular telephone system for each of the remote telemetry units 12a–12n.

Figure 5:
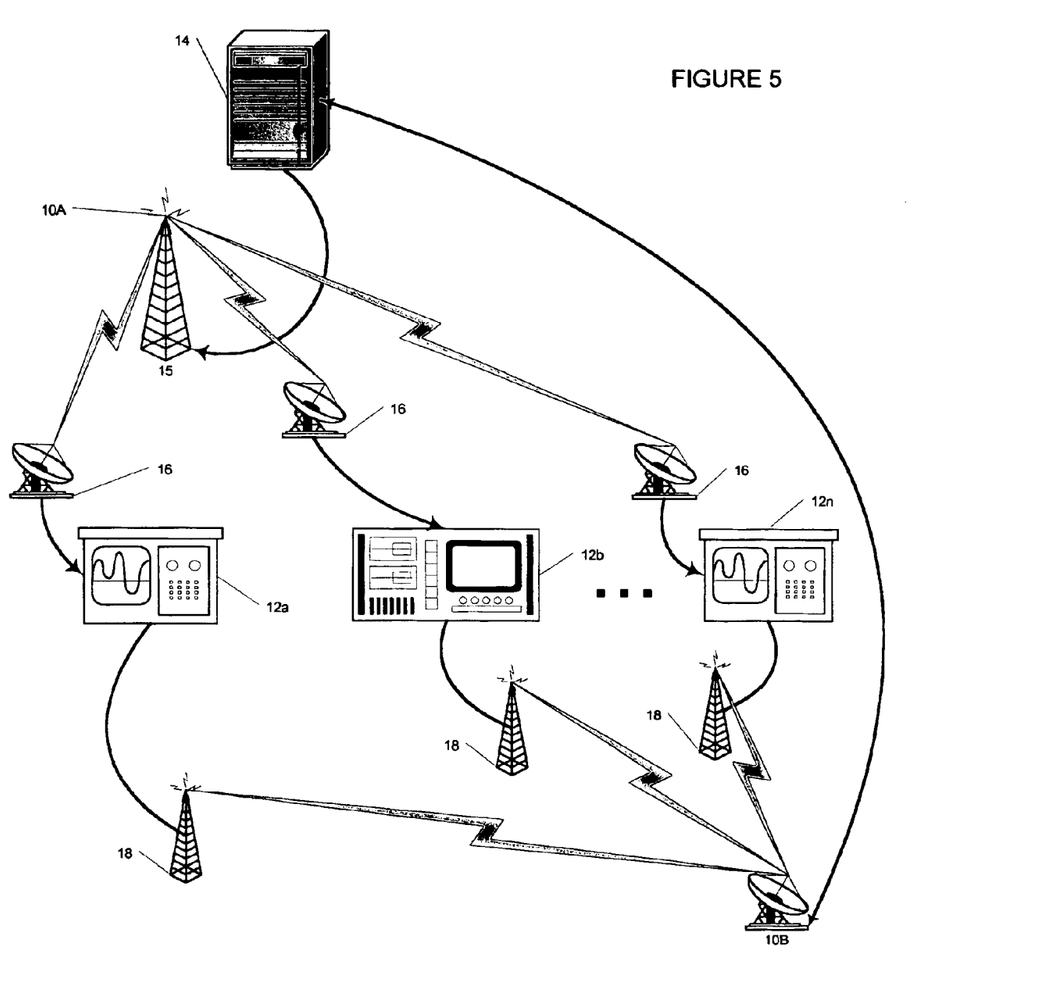
FIG. 5 is a system diagram, similar to FIG. 2, further illustrating a radio-based shared two-way communications pathway connecting the remote telemetry units to the central controller.

In a fourth alternate embodiment, illustrated in FIG. 5, both communications pathways 10A and 10B are broadcast radio channels. Communications pathway 10A, intended primarily for broadcasting messages from the central controller 14 to the individual remote telemetry units 12a–12n is optimized for low-power reception at the receiver 16 of each of the remote telemetry units 12a–12n, using conventional analog or digital radio communications techniques. For example, a high-powered radio transmitter 15 may be associated with the central controller 14, which transmits messages at a low data rate. Corresponding low-power receivers 16 may be associated with each of the remote telemetry units 12a–12n to receive and interpret the messages sent by the central controller 14 over communications pathway 10A. The second communication pathway 10B, is optimized as a broadcast shared two-way communications pathway. The transceivers 18 associated with each of the remote telemetry units 12a–12n are maintained in an inactive or powered down state when not in use, to significantly reduce power consumption, and thereby either extend battery life or reduce operating costs, by each of the remote telemetry units 12a–12n. When activated, a transceiver 18 will transmit requested data to a receiver in the broadcast shared two-way communications pathway 10B, which will relay the message to the central controller 14, either directly or through a number of repeater sub-stations (not shown). Those of ordinary skill in the art will recognize that any conventional broadcast technology may be utilized by the shared two-way communications pathway 10B, for example, radio using frequency modulation, radio using amplitude modulation, microwave or infrared transmission systems, and that any conventional encoding or encryption techniques may be employed.

Figure 6:
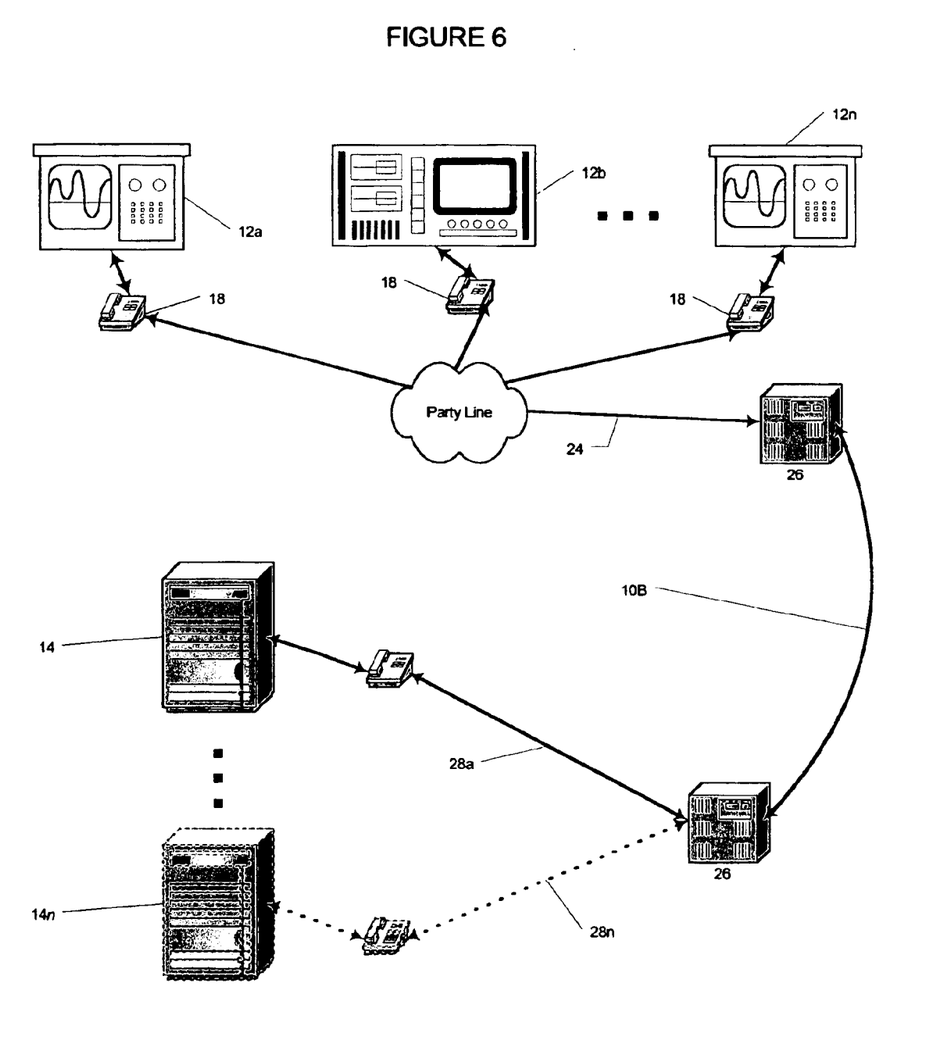
FIG. 6 is a system diagram, similar to FIG. 2, further illustrating a party-line shared two-way communications pathway connecting the remote telemetry units to a plurality of controllers.

In a fifth alternate embodiment, shown in FIG. 6, both communications pathways 10A and 10B utilize a conventional telephone system 26. The transceiver 18 of each of the remote telemetry units 12a–12n within a set is a conventional telephone unit (i.e. a conventional modem) linked to the shared two-way communications pathway 10B. Each of the telephone units is assigned a single shared telephone number on a single subscriber telephone line 24, in much the same manner as a "party-line" residential subscriber telephone line. Each central controller 14a–14n is linked to a second subscriber telephone line 28a–28n, and connected to the conventional telephone network 26. To communicate with the remote telemetry units 12a–12n, a central controller 14 initiates a call to the single shared telephone number via the telephone network 26, causing each of the transceivers 18 to answer, or go "off-hook". Once each of the transceivers 18 associated with the remote telemetry units 12a–12n is "off-hook", the central controller 14 transmits a recipient identification code to all of the "off-hook" transceivers using standard DTMF codes. Only the remote telemetry unit having a unique identification code matching the recipient identification code will continue to remain "off-hook". The transceivers associated with each of the other remote telemetry units will return to an inactive or "on-hook" state, thereby permitting the remaining "off-hook" transceiver and the central controller 14 to establish a conventional modem connection over the open communications channel for the exchange of information.

As will be readily recognized, the alternate methods of the present invention for communicating between one or more central controllers 14–14n and a number of remote telemetry units 12a–12n may be utilized exclusively or in combination, for example, the central controllers may communicate messages to the remote telemetry units 12a–12n using a high-powered radio broadcast communications pathway 10A, and in turn, the remote telemetry units may communicate with the central controller over a conventional telephone line communications pathway 10B. In each embodiment, inexpensive resources (the broadcast communications channel 10A) and expensive resources (the shared two-way communications channel 10B) are utilized in combination to achieve a high degree of efficiency.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. A dual communication channel remote telemetry system comprising:
   at least one central controller configured to generate at least one control message and to receive at least one reporting message, said at least one central controller further configured to access a subscriber telephone line for carrying said control message and to access said subscriber telephone line a for receiving said reporting message;
   a plurality of remote telemetry units configured to measure at least one local parameter and to generate at least one reporting message, each of said plurality of remote telemetry units having a unique identifier and having a receiver configured to receive said control message over said subscriber telephone line and a transceiver configured for communicating said reporting message to said at least one central controller over said subscriber telephone line;
   wherein said subscriber telephone line further comprises a broadcast communication channel; and wherein said transceiver associated with each of said remote telemetry units is configured with a shared telephone number on said subscriber telephone line.

2. The dual communications channel remote telemetry system of claim 1 wherein simultaneous access to said subscriber telephone line is restricted to one of said transceivers associated with said remote telemetry units.

3. The dual communications channel remote telemetry system of claim 1 where media access control for said subscriber telephone line is regulated by said central controller utilizing said control messages transmitted on said subscriber telephone line.

4. The dual communications channel remote telemetry system of claim 1 wherein said control message carried by said subscriber telephone line is received by each of said plurality of remote telemetry units.

5. The dual communications channel remote telemetry system of claim 4 wherein each of said plurality of remote telemetry units is configured to respond to said control message carried by said subscriber telephone line.

6. The dual communications channel remote telemetry system of claim 4 wherein said control message includes a remote telemetry recipient identifier, only said remote telemetry unit having said unique identifier matching said remote telemetry recipient identifier configured to respond to said control message carried by said subscriber telephone line.

7. A dual communication channel remote telemetry system comprising:
   at least one central controller configured to generate at least one control message and to receive at least one reporting message, said at least one central controller further configured to access a broadcast communications channel for carrying said control message, and to access a shared two-way communications channel for receiving said reporting message;
   a plurality of remote telemetry units configured to measure at least one local parameter and to generate at least one reporting message, each of said plurality of remote telemetry units having a unique identifier and having a receiver configured to receive said control message over said broadcast communications channel and a transceiver configured for communicating said reporting message to said at least one central controller over said shared two-way communications channel;
   wherein said broadcast communications channel is a subscriber telephone line; and
   wherein said subscriber telephone line further defines said shared two-way communications channel, said telephone line, said transceiver associated with each of said remote telemetry units configured as an extension on a shared telephone number of a subscriber telephone line.

8. A dual communication channel remote telemetry system comprising:
   at least one central controller configured to generate at least one control message and to receive at least one reporting message, said at least one central controller further configured to access a broadcast communications channel for carrying said control message, and to access a shared two-way communications channel for receiving said reporting message;
   a plurality of remote telemetry units configured to measure at least one local parameter and to generate at least one reporting message, each of said plurality of remote telemetry units having a unique identifier and having a receiver configured to receive said control message over said broadcast communications channel and a transceiver configured for communicating said reporting message to said at least one central controller over said shared two-way communications channel;
   wherein said shared two-way communications channel is a subscriber telephone line, said subscriber telephone line further comprising said broadcast communications channel; and
   wherein said transceiver associated with each of said remote telemetry units is configured with a shared telephone number as a subscriber party telephone line.

9. The dual communications channel remote telemetry system of claim 8 wherein said control message comprises DTMF codes.

10. A method of remote telemetering in a dual communications pathway system in which at least one central controller having a subscriber telephone line defining a broadcast communications pathway and a shared two-way communication pathway, communicates with a plurality of remote telemetry units each having a unique identifier and each configured with a shared telephone number as a subscriber telephone line, said broadcast communications pathway carrying at least one control message and said shared two-way communications pathway carrying at least one reporting message, the method comprising the steps of:

generating, at said at least one central controller, a control message for transmission to said plurality of remote telemetry units, said control message including a recipient identifier associated with one of said plurality of remote telemetry units;

transmitting said control message from said at least one central controller over said broadcast communications pathway;

receiving, at each of said plurality of remote telemetry units, said control message;

comparing, at each of said plurality of remote telemetry units, said recipient identifier included in said control message with said unique identification code of said receiving remote telemetry unit; and responsive to a match between said recipient identifier and said associated unique identification code, one of said plurality of remote telemetry units performing an operation instructed in said control message.

11. The method of remote telemetering in a dual communications pathway system of claim 10 further including the steps of:

responsive to said operation, establishing a communication link between said one of said plurality of remote telemetry units and said at least one central control over said shared two-way communications pathway;

transmitting at least one reporting message from said one of said plurality of remote telemetry units to said at least one central controller over said communication link; and closing said communication link upon completion of said reporting message transmission to said at least one central controller.

* * * * *

UNITED STATES PATENT AND TRADEMARK OFFICE
CERTIFICATE OF CORRECTION

PATENT NO.    : 6,940,421 B2
DATED         : September 6, 2005
INVENTOR(S)   : Roger D. Chamberlain and John C. Bell It is certified that error appears in the above-identified patent and that said Letters Patent is hereby corrected as shown below:

<u>Column 8,</u>
Lines 35 and 36, after the word "channel", please remove the words "said telephone line,".

Signed and Sealed this

Thirteenth Day of December, 2005

JON W. DUDAS
*Director of the United States Patent and Trademark Office*